US012145824B2

(12) United States Patent
Toida et al.

(10) Patent No.: US 12,145,824 B2
(45) Date of Patent: Nov. 19, 2024

(54) CRANE SYSTEM HAVING MOBILE UNIT WITH OBSTACLE LIGHT

(71) Applicant: SUMITOMO HEAVY INDUSTRIES CONSTRUCTION CRANES CO., LTD., Tokyo (JP)

(72) Inventors: Minoru Toida, Tokyo (JP); Kohei Honjo, Obu (JP)

(73) Assignee: SUMITOMO HEAVY INDUSTRIES CONSTRUCTION CRANES CO., LTD., Tokyo (JP)

( * ) Notice: Subject to any disclaimer, the term of this patent is extended or adjusted under 35 U.S.C. 154(b) by 0 days.

(21) Appl. No.: 17/951,152

(22) Filed: Sep. 23, 2022

(65) Prior Publication Data

US 2023/0018361 A1 Jan. 19, 2023

Related U.S. Application Data

(63) Continuation of application No. PCT/JP2021/012954, filed on Mar. 26, 2021.

(30) Foreign Application Priority Data

Mar. 27, 2020 (JP) ................................ 2020-057204

(51) Int. Cl.
*B66C 15/06* (2006.01)

(52) U.S. Cl.
CPC .................................. *B66C 15/06* (2013.01)

(58) Field of Classification Search
CPC ..................................................... B66C 15/06
See application file for complete search history.

(56) References Cited

U.S. PATENT DOCUMENTS

| | | | | |
|---|---|---|---|---|
| 11,679,961 | B2 * | 6/2023 | Palberg | B64C 39/024 701/3 |
| 11,885,298 | B2 * | 1/2024 | Roodenburg | F03D 13/25 |
| 2019/0016569 | A1 | 1/2019 | Palberg | |

FOREIGN PATENT DOCUMENTS

| | | | |
|---|---|---|---|
| CN | 206735669 | U | 12/2017 |
| CN | 1 09 027 800 | A | 12/2018 |
| DE | 10 2016 004 250 | A1 | 10/2017 |
| JP | 2002-3151 | A | 1/2002 |
| JP | 2008-308328 | A | 12/2008 |
| JP | 2010-127098 | A | 6/2010 |
| JP | 2019-69835 | A | 5/2019 |
| KR | 20-2015-0002289 | U | 6/2015 |

OTHER PUBLICATIONS

PCT International Search Report of PCT/JP2021/012954 mailed Jun. 15, 2021 by Japan Patent Office.
Office Action of the corresponding DE 112021001948.1 mailed on Aug. 21, 2024.

* cited by examiner

*Primary Examiner* — Hongmin Fan
(74) *Attorney, Agent, or Firm* — WTA Patents

(57) ABSTRACT

A crane system, a crane, and a mobile unit capable of easily coping with a case where electrical equipment such as an obstacle light fails are to be provided. A crane system includes a crane body and a mobile unit movable around the crane body. The mobile unit includes an obstacle light and functions as an obstacle light for the crane body.

15 Claims, 11 Drawing Sheets

CRANE SYSTEM HAVING MOBILE UNIT WITH OBSTACLE LIGHT

CROSS-REFERENCE TO RELATED APPLICATIONS

This is a bypass continuation application of International PCT Patent Application No. PCT/JP2021/012954 filed on Mar. 26, 2021, which claims priority to Japanese Patent Application No. 2020-057204, filed on Mar. 27, 2020, which are incorporated by reference herein in their entirety.

BACKGROUND

Technical Field

Certain embodiments of the present invention relate to a crane system, a crane, and a mobile unit.

Description of Related Art

The related art discloses a crane with an obstacle light. A crane at or above a predetermined height needs to be equipped with an obstacle light so that aircraft is notified of its presence.

SUMMARY

According to one aspect of the present invention, there is provided a crane system including a crane body and a mobile unit movable around the crane body, in which the mobile unit includes an obstacle light and functions as an obstacle light for the crane body.

According to another aspect of the present invention, there is provided a crane requiring an obstacle light and including a disposition section where a mobile unit with an obstacle light can be disposed, while an obstacle light is not provided at an obstacle light-requiring position.

According to still another aspect of the present invention, there is provided a crane including a special disposition section including a special structure for holding a mobile unit including an obstacle light or a structure for supplying electric power to the obstacle light of the mobile unit.

According to still another aspect of the present invention, there is provided a mobile unit movable around a crane body and including second electrical equipment functioning as first electrical equipment of the crane body.

DETAILED DESCRIPTION

In a crane equipped with electrical equipment such as an obstacle light, in a case where the electrical equipment fails, a boom of the crane needs to be lowered, or a worker needs to climb up to the position of the electrical equipment to repair the electrical equipment.

It is desirable to provide a crane system, a crane, and a mobile unit capable of easily coping with a case where electrical equipment such as an obstacle light fails.

Hereinafter, each embodiment of the present invention will be described in detail with reference to the drawings.

Figure 1:
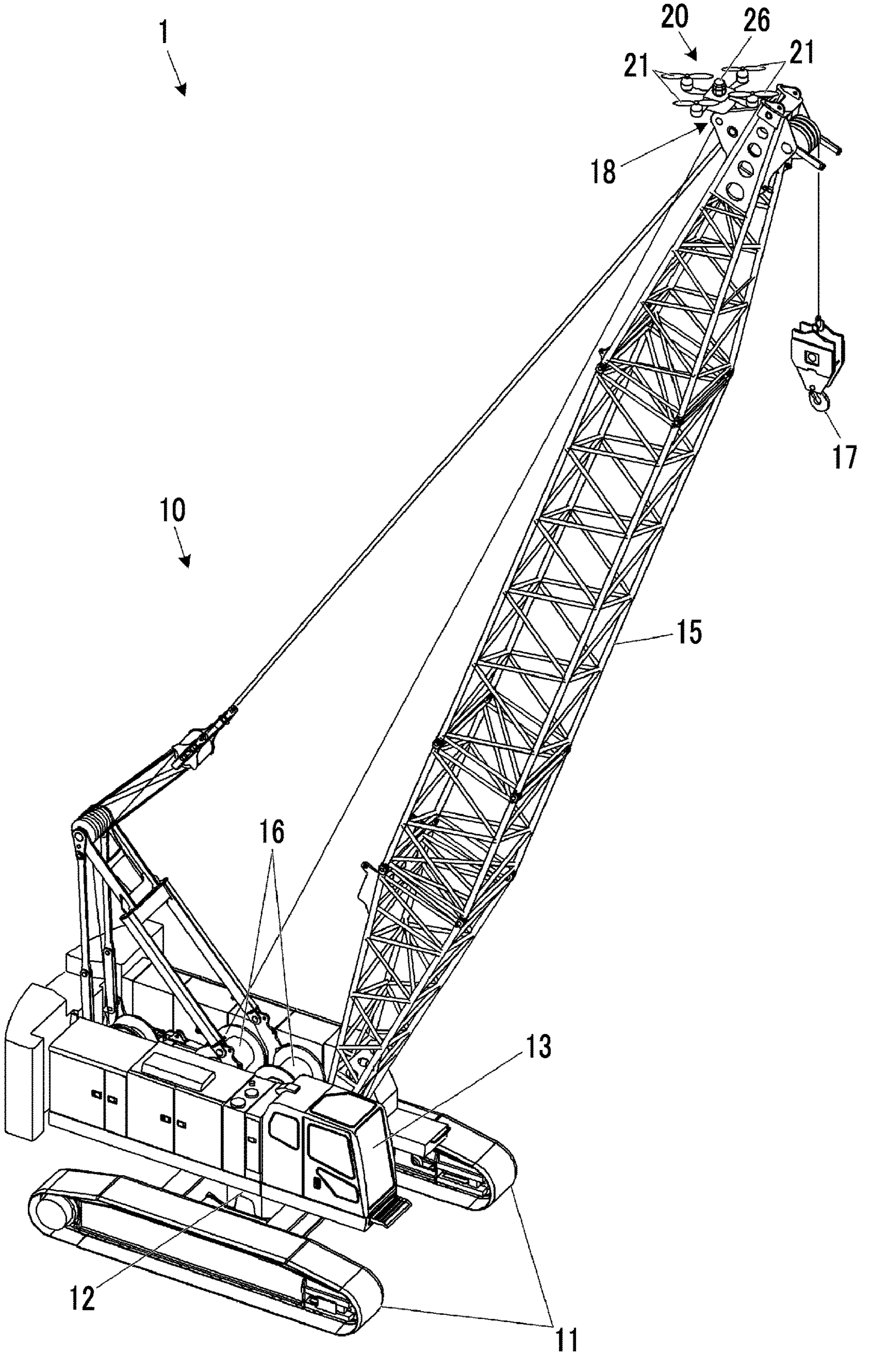
FIG. 1 is a perspective view illustrating a crane system according to an embodiment of the present invention.
Figure 2A:
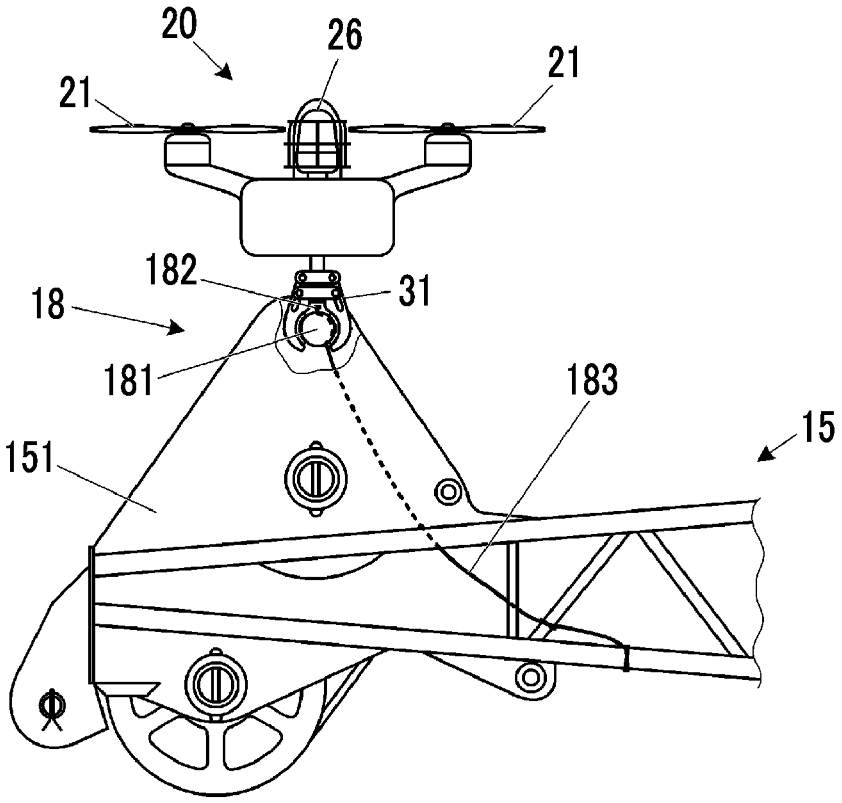
FIG. 2A is a side view illustrating a disposition section of FIG. 1.
Figure 2B:
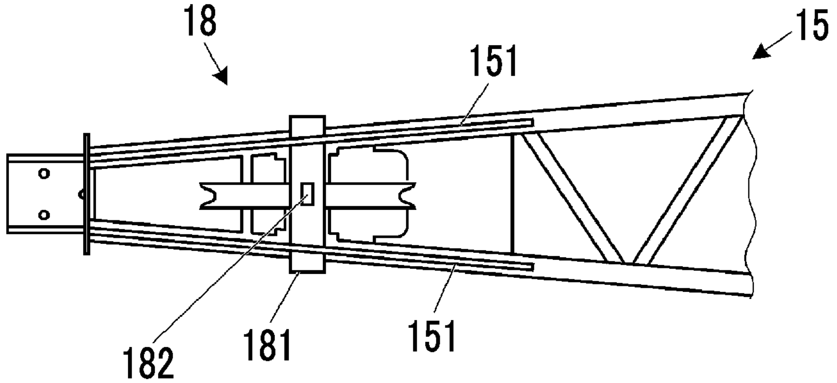
FIG. 2B is a top view illustrating the disposition section of FIG. 1.

FIG. 1 is a perspective view illustrating a crane system according to an embodiment of the present invention. FIG. 2A is a side view illustrating a disposition section of FIG. 1. FIG. 2B is a top view illustrating the disposition section of FIG. 1. FIG. 2A illustrates a partially cutaway view of a plate 151 supporting a rod-shaped connected portion 181. FIG. 2B illustrates a state where a mobile unit 20 is absent.

A crane system 1 of the present embodiment includes a crane body 10 and the mobile unit 20. The crane body 10 may be called a crane. The crane body 10 includes, for example, a traveling body 11 having a crawler or the like, a turning portion 12 turning with respect to the traveling body 11, a cab 13 where an operator performs operation, a movable portion 15 such as a boom capable of derricking or the like, a winch 16 moving the movable portion 15, and a load-hanging hook 17. Although the movable portion 15 is a boom in FIG. 1, the movable portion 15 may include a jib, a telescopic boom, or the like.

While the crane body 10 has a height that requires an obstacle light 26, the crane body 10 does not have a fixedly installed obstacle light.

The movable portion 15 is provided with a disposition section 18 where the mobile unit 20 can be parked. The disposition section 18 is provided in a higher end portion of the movable portion 15 in a standing state. The disposition section 18 is released in a wide range in a pivoting direction of the movable portion 15 and, even when the movable portion 15 takes various postures, in many cases, a space where the mobile unit 20 can be parked is ensured above the disposition section 18.

As illustrated in FIGS. 2A and 2B, the disposition section 18 has the connected portion 181 to which the mobile unit 20 can be connected and a power transmission unit 182 supplying electric power to the mobile unit 20. The connected portion 181 is a rod body supported by a part of the movable portion 15 (for example, the plate 151). The power transmission unit 182 is configured to include a power transmission coil transmitting electric power via electromagnetic induction. It should be noted that the power transmission unit 182 may have a configuration in which electric power is transmitted via connector connection or inter-electrode contact. Electric power is supplied to the power transmission unit 182 via a power line 183. The electric power may be a commercial power supply or may be electric power generated by the crane body 10 or stored electric power. The power transmission unit 182 is a dedicated component used in a case where the mobile unit 20 is parked, and the disposition section 18 having the power transmission unit 182 also corresponds to a special disposition section for parking the mobile unit 20.

Figure 3A:
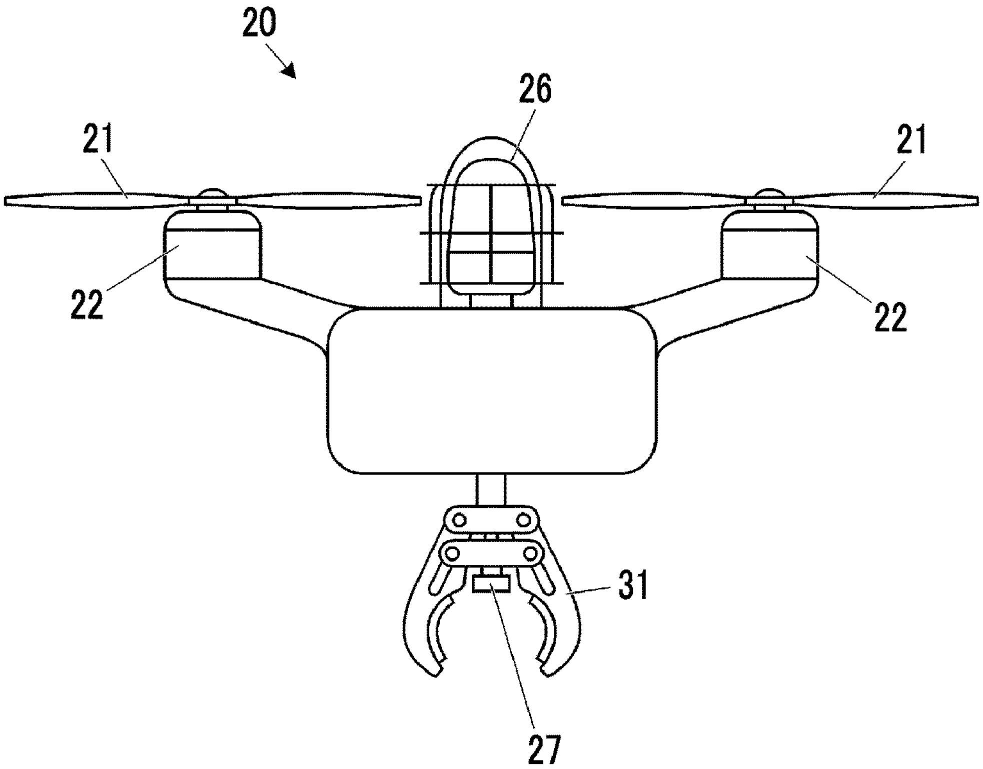
FIG. 3A is a side view illustrating a mobile unit of FIG. 1.
Figure 3B:
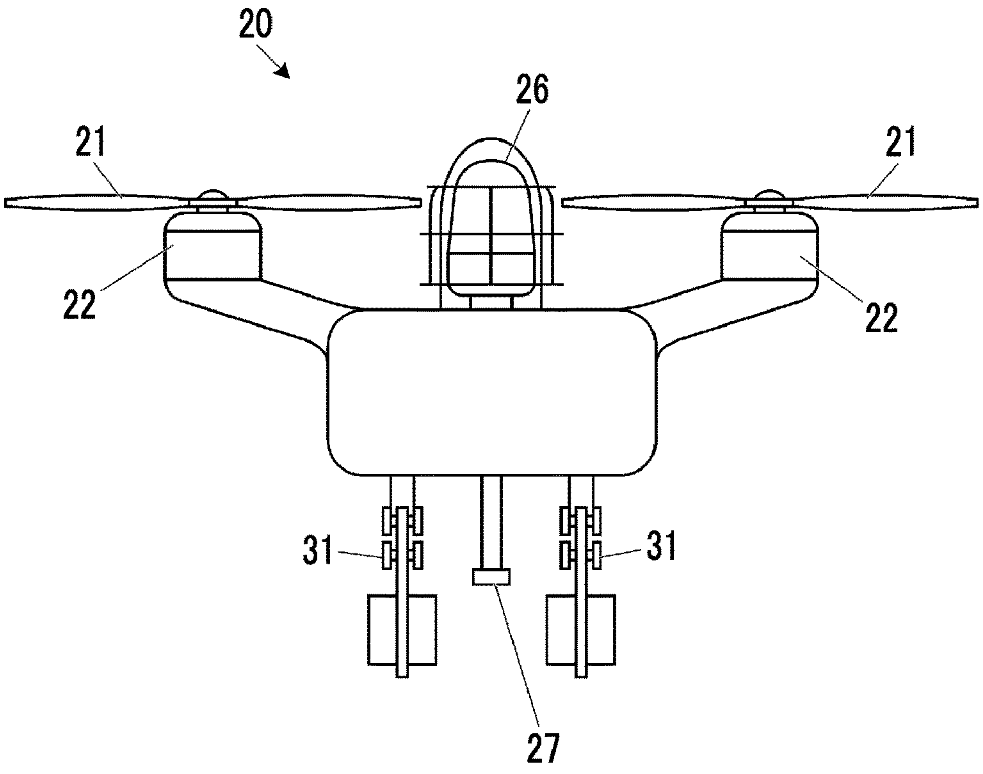
FIG. 3B is a front view illustrating the mobile unit of FIG. 1.
Figure 4:
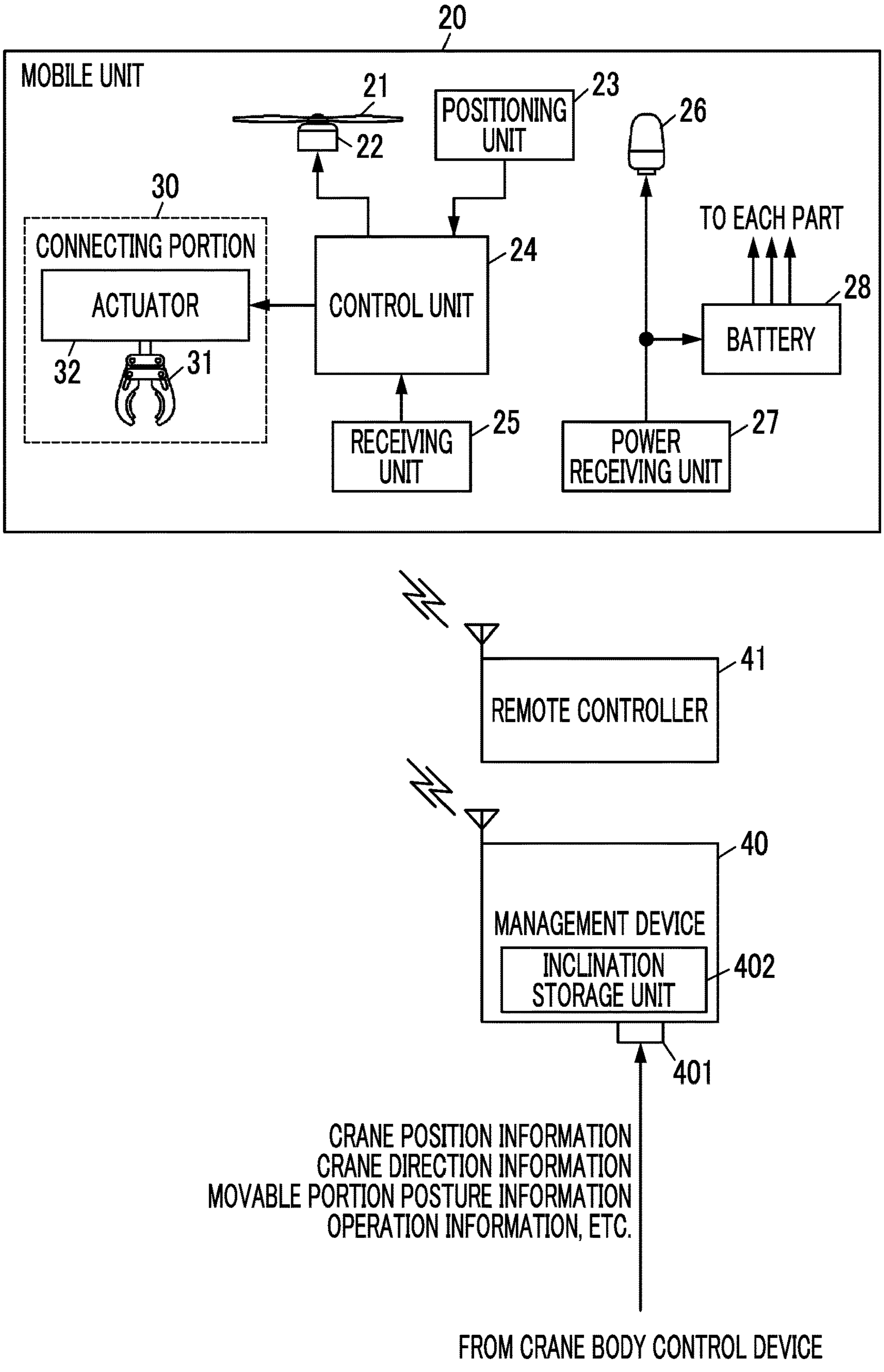
FIG. 4 is a block diagram illustrating a configuration of the mobile unit.

FIG. 3A is a side view illustrating the mobile unit. FIG. 3B is a front view illustrating the mobile unit. FIG. 4 is a block diagram illustrating the configuration of the mobile unit.

The mobile unit 20 is, for example, a so-called drone capable of flying in the air, moving up, down, forward, backward, to the left, and to the right, and turning forward and backward. The mobile unit 20 includes a plurality of propellers 21, a drive unit 22 driving the plurality of propellers 21, a positioning unit 23 performing positioning, a control unit 24 controlling the drive unit 22, a receiving unit 25 receiving a command from the outside via, for example, radio, the obstacle light 26, a connecting portion 30 connectable to the connected portion 181 of the crane body 10, and a power receiving unit 27 capable of receiving electric power from an external source. Further, the crane system 1 may include a remote controller 41 for manually operating the mobile unit 20. In addition, the crane system 1 may include a management device 40 for autonomously moving the mobile unit 20. The remote controller 41 or the management device 40 is capable of transmitting a command to the mobile unit 20 via, for example, radio. The management device 40 is, for example, a computer disposed in the cab 13 of the crane body 10.

The connecting portion 30 has a gripping mechanism 31 capable of gripping the connected portion 181 of the disposition section 18 and an actuator 32 driving the gripping mechanism 31. The actuator 32 is controlled by the control unit 24.

The power receiving unit 27 has a power receiving coil and is capable of receiving electric power without contact via electromagnetic induction. It should be noted that the power receiving unit 27 and the power transmission unit 182 of the disposition section 18 may be configured to be interconnected via a connector or may be configured to be interconnected by electrode contact. The electric power supplied to the power receiving unit 27 is supplied to the obstacle light 26 to cause the obstacle light 26 to flicker. Some of the electric power supplied to the power receiving unit 27 may be stored in a battery 28 and be used as a power supply for each drive system and a control system.

The positioning unit 23 performs positioning using, for example, a global navigation satellite system (GNSS), a beacon, or both, and orientation detection using a gyro sensor or the like to measure the position and direction of the mobile unit 20. Information on the position and direction measured by the positioning unit 23 is supplied to the control unit 24.

The control unit 24 receives a command from the outside via the receiving unit 25, inputs positioning information from the positioning unit 23, and performs drive control on the drive unit 22 and on the actuator 32 of the connecting portion 30. For example, when a movement command is input via the receiving unit 25, the control unit 24 controls the drive unit 22 while referring to the positioning result of the positioning unit 23 and moves the mobile unit 20 in accordance with the command. In addition, when a drive command for the connecting portion 30 is input, the control unit 24 drives the actuator 32 in accordance with the command and opens and closes the gripping mechanism 31 to realize the operation of connecting or disconnecting the connecting portion 30 in accordance with the command.

According to the mobile unit 20 configured as described above, by an attendant using the remote controller 41 to send a steering command to the mobile unit 20, the mobile unit 20 can be moved to the disposition section 18 and be parked in the disposition section 18, or the mobile unit 20 can be launched from the disposition section 18 and be moved to another location. In addition, by the management device 40 sending position and direction information on a destination along with a movement command, the mobile unit 20 can be moved to the destination and be oriented in a predetermined direction. By sending position information on the disposition section 18 as destination position information, the mobile unit 20 can be moved to the disposition section 18. Further, by the management device 40 sending a connection command for the connecting portion 30 after the movement, the connecting portion 30 is connected to the connected portion 181, and the mobile unit 20 can be parked in the disposition section 18. The management device 40 is capable of calculating the position and direction of the disposition section 18 by receiving the position and direction information of the positioning device provided in the crane body 10 and posture information on the movable portion 15 from the control device of the crane body 10. "Parking" means a state where the connecting portion 30 and the connected portion 181 are connected and the propeller 21 of the mobile unit 20 is stopped.

Example of Use of Mobile Unit

In one example of use, the mobile unit 20 is pre-disposed in the disposition section 18 of the crane body 10. In the disposition section 18, the connecting portion 30 of the mobile unit 20 is connected to the connected portion 181, the power receiving unit 27 of the mobile unit 20 and the power transmission unit 182 of the disposition section 18 are close to and face each other, and electric power transmission can be performed.

In ending the work of the crane body 10, the obstacle light 26 needs to be driven in a case where the movable portion 15 cannot be lowered and the crane body 10 is stopped with the movable portion 15 standing. In this case, the attendant supplies electric power to the power transmission unit 182 by connecting the power line 183 (see FIG. 2A) to a power supply. As a result, electric power is transmitted from the power transmission unit 182 to the power receiving unit 27 of the mobile unit 20, and the obstacle light 26 flickers in the end portion of the movable portion 15.

It should be noted that the obstacle light 26 may be a configuration driven by electric power supply, or the control unit 24 may be configured to drive the obstacle light 26 based on a command from the remote controller 41 or from the management device 40. In addition, the obstacle light 26 may be configured to be automatically driven depending on the time or ambient brightness on the condition that there is electric power supply. In addition, although an example of driving the obstacle light in ending the work of the crane body 10 is illustrated in the above example, the obstacle light 26 of the mobile unit 20 may be used as an obstacle light driven during work or during the day, such as at a site near an airport.

In a case where a failure of the obstacle light 26 is found at, for example, a site where the movable portion 15 cannot be lowered, the attendant sends a command from the remote controller 41 or from the management device 40 to the mobile unit 20 to move onto the ground. With this command, the mobile unit 20 disconnects the connecting portion 30, drives the propeller 21, and takes off from the disposition section 18. Then, the mobile unit 20 moves onto the ground.

With the mobile unit 20 moving onto the ground, the attendant can repair the failure of the obstacle light 26 by, for example, bulb replacement. After the repair, the attendant outputs a command from the remote controller 41 or from the management device 40 to the mobile unit 20 to move to the disposition section 18. Then, the mobile unit 20 moves to the disposition section 18, and the connecting portion 30 performs connection, which leads to parking in the disposition section 18. After that, the mobile unit 20 with the obstacle light 26 that is normal is disposed in the disposition section 18 of the crane body 10, and thus the attendant can operate the obstacle light 26 when necessary.

It should be noted that the mobile unit 20 may wait at a location different from the crane body 10 when the operation of the obstacle light 26 is unnecessary, such as during the work of the crane body 10, and the mobile unit 20 may move to the disposition section 18 of the crane body 10 to operate the obstacle light 26 when the obstacle light 26 needs to be operated. In this case of configuration, the management device 40 may issue a command to the mobile unit 20, the mobile unit 20 may move to the disposition section 18, and the obstacle light 26 may be operated triggered by an operation indicating the end of the work in the cab 13 (for example, engine stop operation). In addition, in the case of a crane that takes a rest posture by jib lowering, the rest posture may be regarded as the end of work.

Mobile Unit Tilt Management

Figure 5A:
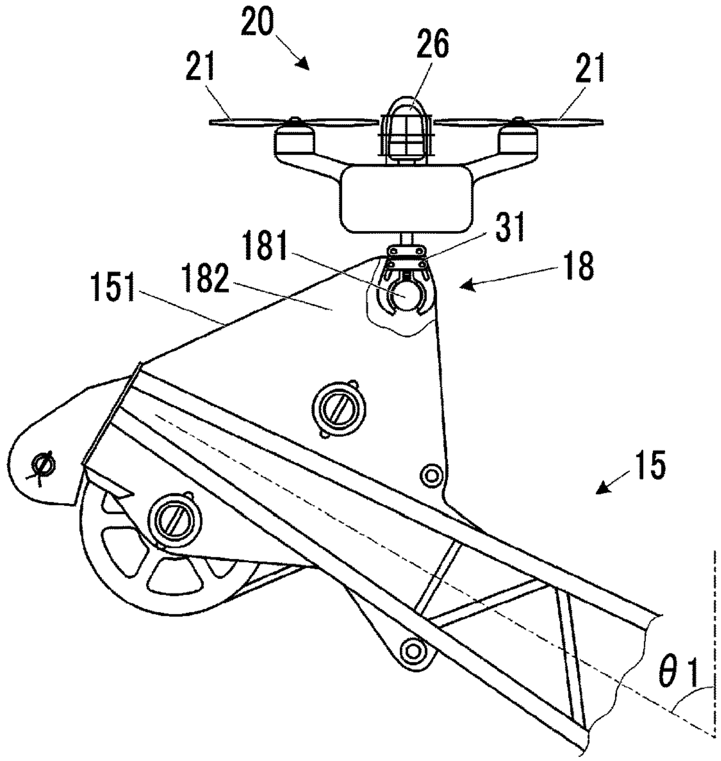
FIG. 5A is a side view illustrating a first example of the posture of a movable portion of a crane and the disposition posture of the mobile unit.
Figure 5B:
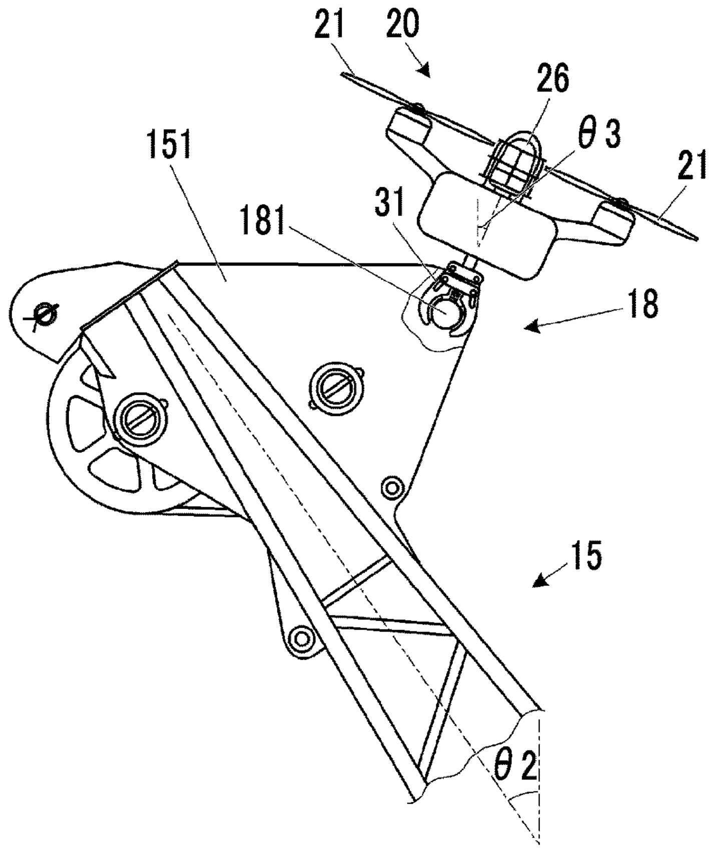
FIG. 5B is a side view illustrating a second example of the posture of the movable portion of the crane and the disposition posture of the mobile unit.

FIG. 5A is a side view illustrating a first example of the posture of the movable portion of the crane and the disposition posture of the mobile unit. FIG. 5B is a side view illustrating a second example of the posture of the movable portion of the crane and the disposition posture of the mobile unit.

When the posture of the movable portion 15 changes with the mobile unit 20 connected to the disposition section 18, the tilt of the mobile unit 20 changes as illustrated in FIGS. 5A and 5B. In some cases, the tilt of the mobile unit 20 in operating the obstacle light 26 and the tilt of the mobile unit 20 in taking off from the disposition section 18 are limited.

The tilt of the mobile unit 20 can be visually confirmed by the attendant. In addition, the tilt of the mobile unit 20 can be calculated by the management device 40. The management device 40 is provided with an interface 401 where posture information on the movable portion 15 is input from the crane body 10 and an inclination storage unit 402 storing the posture of the movable portion 15 when the mobile unit 20 is parked in the disposition section 18 (see FIG. 4). The management device 40 is capable of calculating the current inclination of the mobile unit 20 from the information stored in the inclination storage unit 402 and information on the current posture of the movable portion 15. For example, as illustrated in FIGS. 5A and 5B, a tilt θ3 of the mobile unit 20 can be calculated as "θ3=θ1−θ2" on the condition that the angle θ1 is the posture taken by the movable portion 15 when the mobile unit 20 is parked and the angle θ2 is the current posture of the movable portion 15.

In a case where the tilt θ3 of the mobile unit 20 in operating the obstacle light 26 is limited, the tilt θ3 of the mobile unit 20 is confirmed visually by the attendant or by the calculation processing of the management device 40 when the obstacle light 26 is operated. In a case where the tilt θ3 exceeds the limit, the attendant or the management device 40 once again launches the mobile unit 20 from the disposition section 18 and re-parks the mobile unit 20 in the disposition section 18. By this processing, the tilt of the mobile unit 20 is corrected into the limit range, and the obstacle light 26 can be operated with the corrected tilt.

In a case where the tilt θ3 of the mobile unit 20 in taking off from the disposition section 18 is limited, the tilt θ3 of the mobile unit 20 is confirmed visually by the attendant or by the calculation processing of the management device 40 when the mobile unit 20 is launched. In a case where the tilt θ3 exceeds the limit, the attendant recognizes that the posture of the movable portion 15 needs to be corrected. Alternatively, before the management device 40 sends a movement command to the mobile unit 20, a warning is issued from the management device 40 to indicate that the mobile unit 20 cannot be moved unless the posture of the movable portion 15 is changed in any manner. Based on this warning, the attendant recognizes that the posture of the movable portion 15 needs to be corrected. Based on the above recognition, the attendant changes the posture of the movable portion 15 and changes the tilt of the mobile unit 20 into the limit range. After that, the mobile unit 20 can be launched from the disposition section 18 by the steering of the remote controller 41 or by the command of the management device 40.

Modification Example of Disposition Section

Figure 6A:
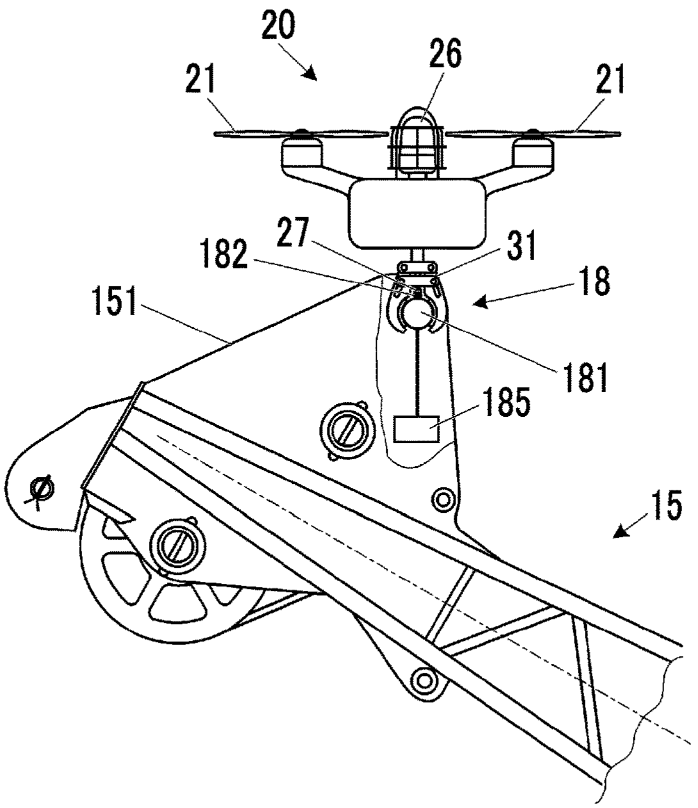
FIG. 6A is a side view illustrating a disposition section of a modification example, in which the movable portion is in a first posture.
Figure 6B:
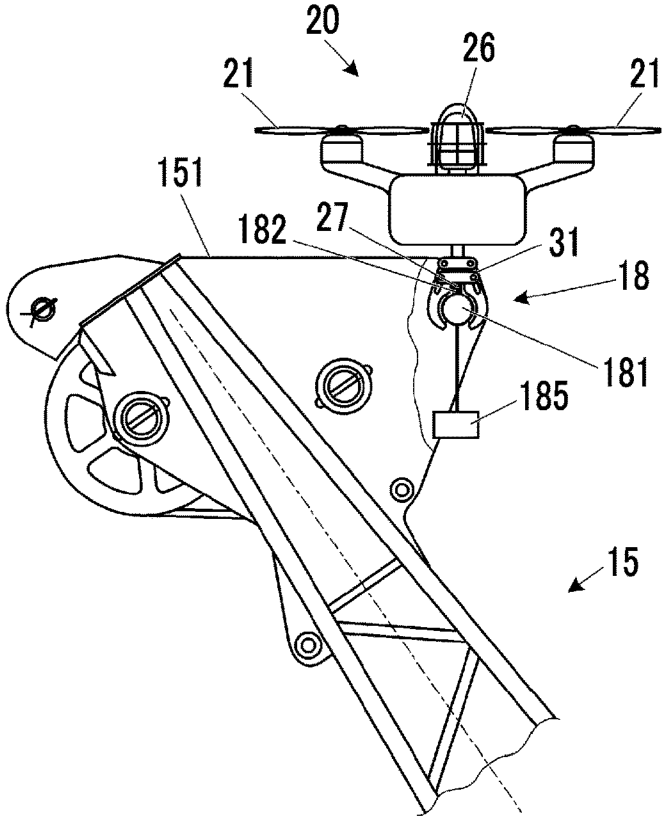
FIG. 6B is a side view illustrating the disposition section of the modification example, in which the movable portion is in a second posture.

As for the configuration of the disposition section 18 of the crane body 10, the modification example illustrated in FIGS. 6A and 6B may be adopted in order to facilitate the management of the tilt of the mobile unit 20. FIG. 6A is a side view illustrating the disposition section of the modification example, in which the movable portion is in a first posture. FIG. 6B is a side view illustrating the disposition section of the modification example, in which the movable portion is in a second posture.

In the disposition section 18 of the modification example, the connected portion (for example, the rod body) 181 is supported by the movable portion 15 of the crane body 10 so as to be capable of pivoting. Further, the disposition section 18 of the modification example is provided with a posture maintaining mechanism 185, which performs rotation adjustment on the connected portion 181 such that an upper end of the connected portion 181 always faces vertically upward even in the event of a change in the posture of the movable portion 15. In the pivoting direction of the connected portion 181, the pivoting center axis is parallel to the pivoting center axis of the movable portion 15. The posture maintaining mechanism 185 is, for example, a weight integrated with the connected portion 181, and the center of gravity of the configuration that is the alignment of the weight, the connected portion 181, and the mobile unit 20 connected to the connected portion 181 is set to be positioned below the pivoting center of the connected portion 181.

According to the disposition section 18 of the modification example, the connected portion 181 pivots such that a predetermined position of the connected portion 181 (for example, the disposition of the power transmission unit 182) always faces vertically upward even in the event of a change in the posture of the movable portion 15. Accordingly, when the mobile unit 20 is connected to the connected portion 181, even if the posture of the movable portion 15 is not constant, the mobile unit 20 and the connected portion 181 can be connected to each other by directional alignment (for example, alignment in the direction in which the power transmission unit 182 and the power receiving unit 27 face each other).

Further, the connected portion 181 pivots such that the horizontal posture of the mobile unit 20 is always maintained even if the posture of the movable portion 15 changes with the mobile unit 20 disposed in the disposition section 18. Accordingly, it is always possible to operate the obstacle light 26 with the direction thereof kept constant and to launch the mobile unit 20 in a level state.

It should be noted that the posture maintaining mechanism 185 is not limited to the weight-based configuration. The posture maintaining mechanism 185 may be configured from a gravity direction detection sensor, an actuator changing the direction of the connected portion 181, and a control circuit controlling the actuator such that the connected portion 181 has a constant direction in accordance with the output of the sensor.

Crane Type and Disposition Section Application Example

Figure 7:
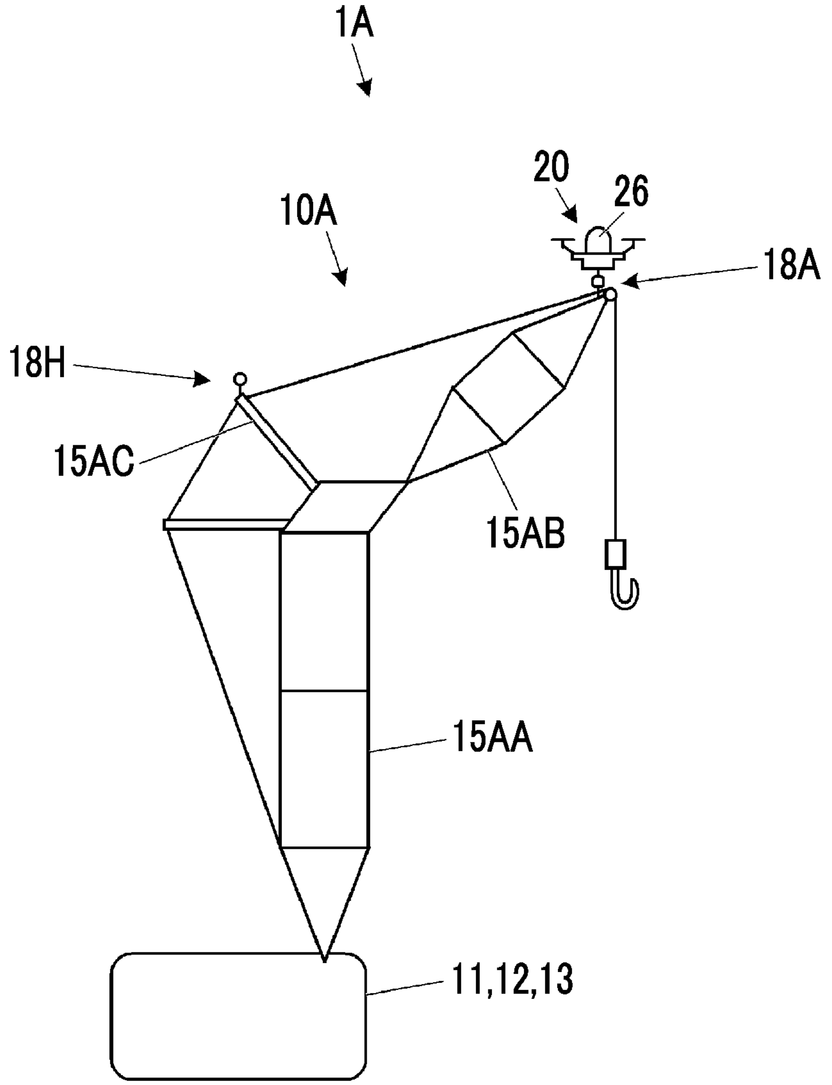
FIG. 7 is a diagram illustrating an example of where the crane and the disposition section are applied.
Figure 8:
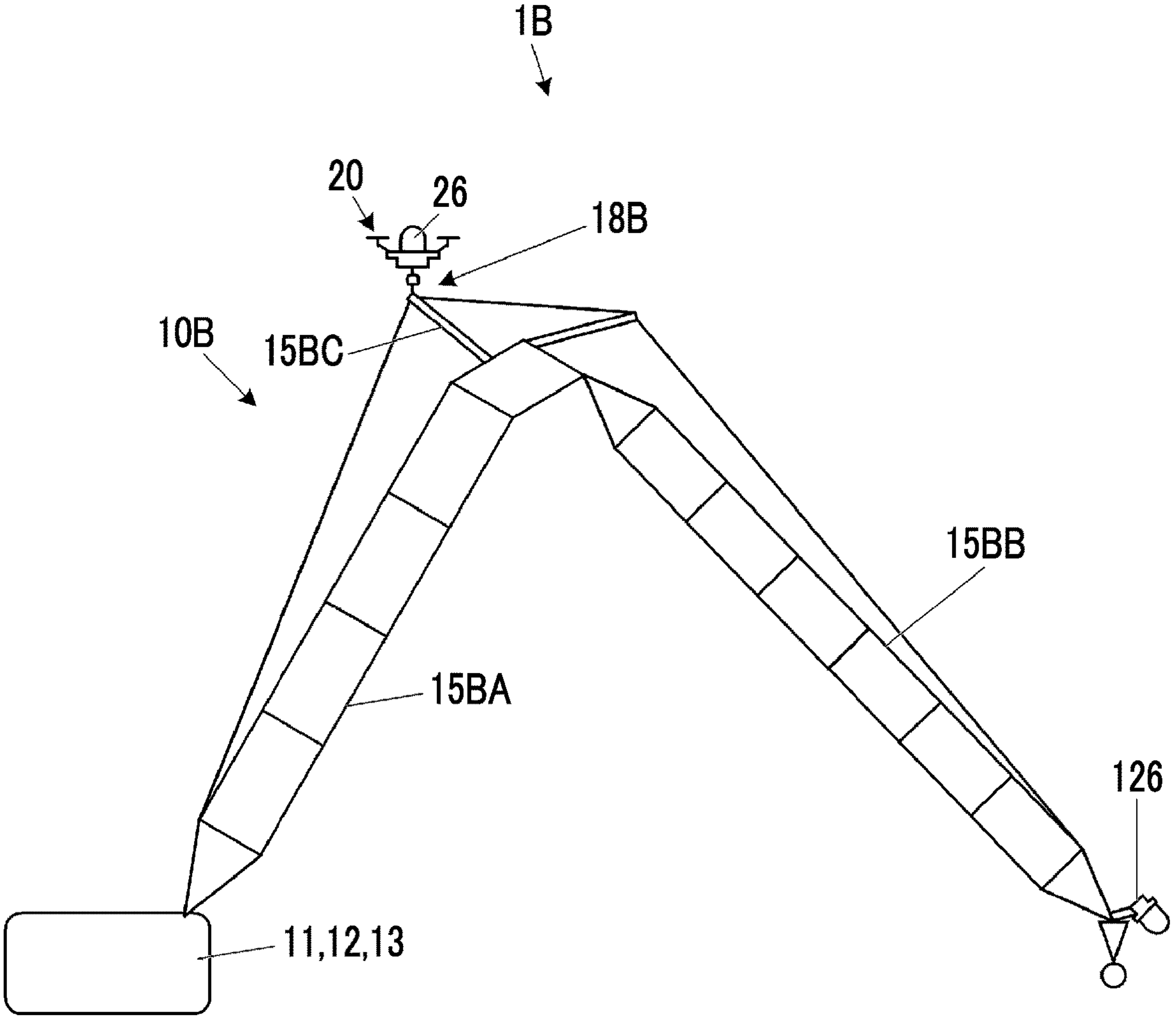
FIG. 8 is a diagram illustrating an example of where the crane and the disposition section are applied.
Figure 9:
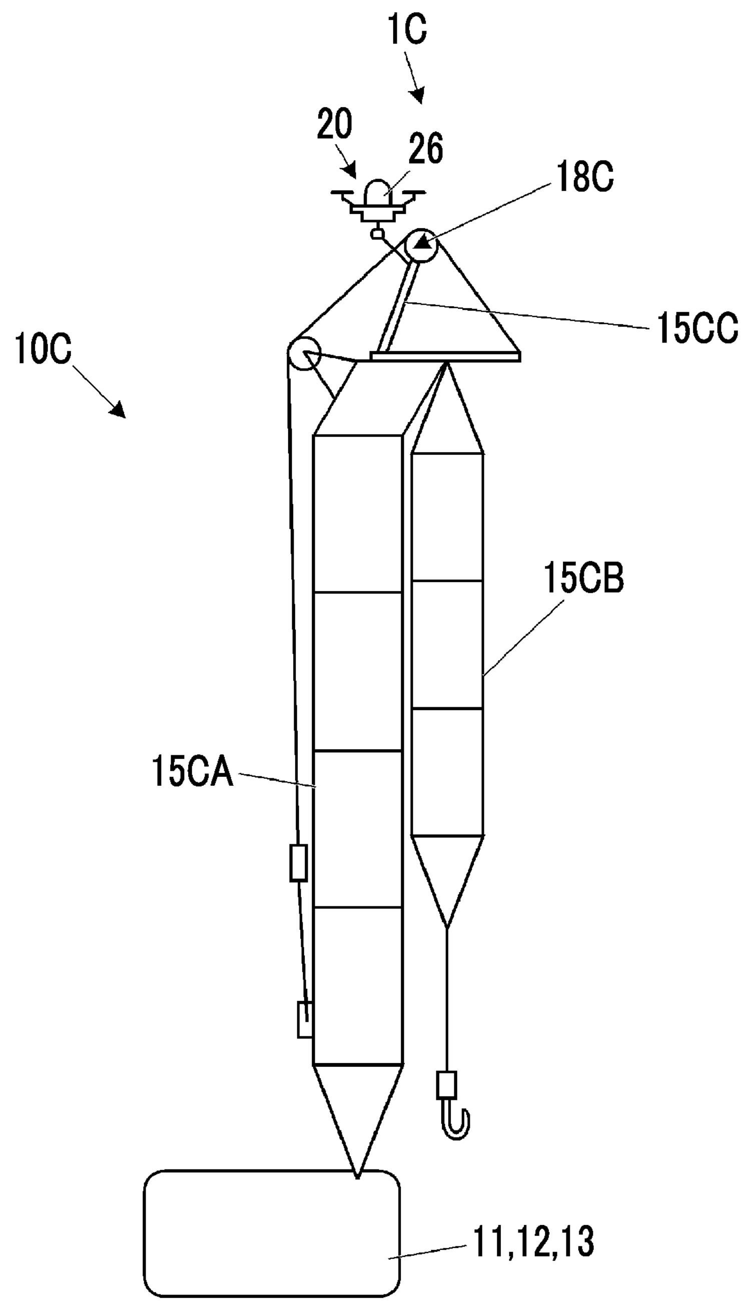
FIG. 9 is a diagram illustrating an example of where the crane and the disposition section are applied.
Figure 10:
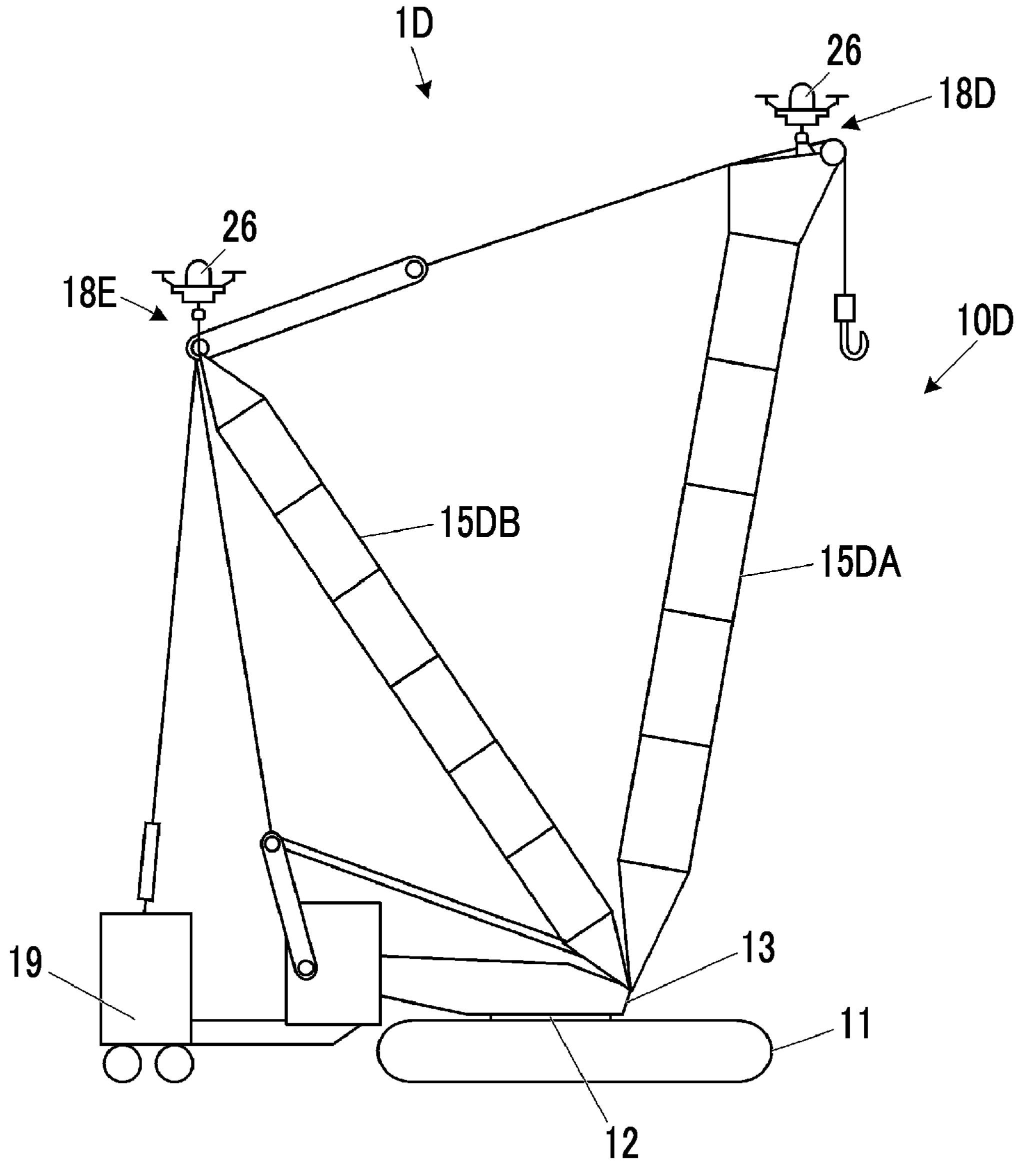
FIG. 10 is a diagram illustrating an example of where the crane and the disposition section are applied.

FIGS. 7 to 10 are diagrams illustrating an example of where the crane and the disposition section are applied. As illustrated in FIGS. 7 to 9, crane systems 1A to 1C provided with the mobile unit 20 of the present embodiment may be systems provided with crane bodies 10A to 10C provided with booms 15AA to 15CA and jibs 15AB to 15CB as movable portions. In addition, a crane system 1D provided with the mobile unit 20 of the present embodiment may be a system having a mast boom 15DB as a movable portion and provided with a crane body 10D provided with a weight bogie 19 as illustrated in FIG. 10. The crane bodies 10A to 10C in FIGS. 7 to 9 are so-called mobile tower cranes, and the crane body 10D in FIG. 10 is a so-called super lift.

In the case of the crane bodies 10A to 10C having the jibs 15AB to 15CB, for example, a disposition section 18A of the mobile unit 20 may be provided at the tip part of the jib 15AB as illustrated in FIG. 7, and disposition sections 18B and 18C of the mobile unit 20 may be provided at the tip parts of struts 15BC and 15CC as illustrated in FIGS. 8 and 9. In a case where the disposition section 18A is provided at the tip part of the jib 15AB (FIG. 7), the mobile unit 20 can be parked in the disposition section 18A, and the obstacle light 26 can be operated around the highest position of the crane body 10A with the jib 15AB standing. In addition, in a case where the disposition sections 18B and 18C are provided at the tip parts of the struts 15BC and 15CC, the mobile unit 20 can be parked in the disposition sections 18B and 18C, and the obstacle light 26 can be operated around the highest positions of the crane bodies 10B and 10C with the jibs 15BB and 15CB lowered or the tips of the jibs 15BB and 15CB facing downward.

In the case of the crane body 10D having the mast boom 15DB, disposition sections 18D and 18E of the mobile unit 20 may be provided at the tip part of a boom 15DA or the tip part of the mast boom 15DB.

It should be noted that the disposition section of the mobile unit 20 may be provided at a plurality of locations on one crane body. For example, in the case of the crane body 10A of FIG. 7, the disposition section 18A and a disposition section 18H may be provided at the two locations of the tip part of the jib 15AB and of a strut 15AC. A plurality of disposition sections 18A and 18H are provided around the highest possible position of the crane body 10A depending on the postures of the boom 15AA and the jib 15AB.

According to such a configuration, even if the highest location changes to one end of the strut 15BC or to the tip of the jib 15AB depending on the posture of the jib 15AB, the higher one of the plurality of disposition sections 18A and 18H can be selected, and the mobile unit 20 can be parked in the selected disposition section. Accordingly, the obstacle light 26 can be operated near the highest position of the crane body 10A.

In addition, the crane body may have both a fixedly installed obstacle light and a disposition section where the mobile unit 20 can be parked. For example, as for the crane body 10B of FIG. 8, a fixed obstacle light 126 is installed at the tip part of the jib 15BB, and the disposition section 18B is provided at the tip part of the strut 15BC. According to such a configuration, the obstacle light 26 of the mobile unit 20 can be operated by operating the fixedly installed obstacle light 126 when the tip of the jib 15BB is in a standing state and by parking the mobile unit 20 in the disposition section 18B when the tip of the jib 15BB is directed downward. By such a method of use, the obstacle lights 26 and 126 can be operated near the highest position of the crane body 10B depending on the posture of the jib 15BB.

Mobile Unit Control Processing

In a case where the crane body has two or more disposition sections, the management device 40 may execute the following automatic operation processing. The following description will be made with reference to the crane body 10A of FIG. 7.

Figure 11:
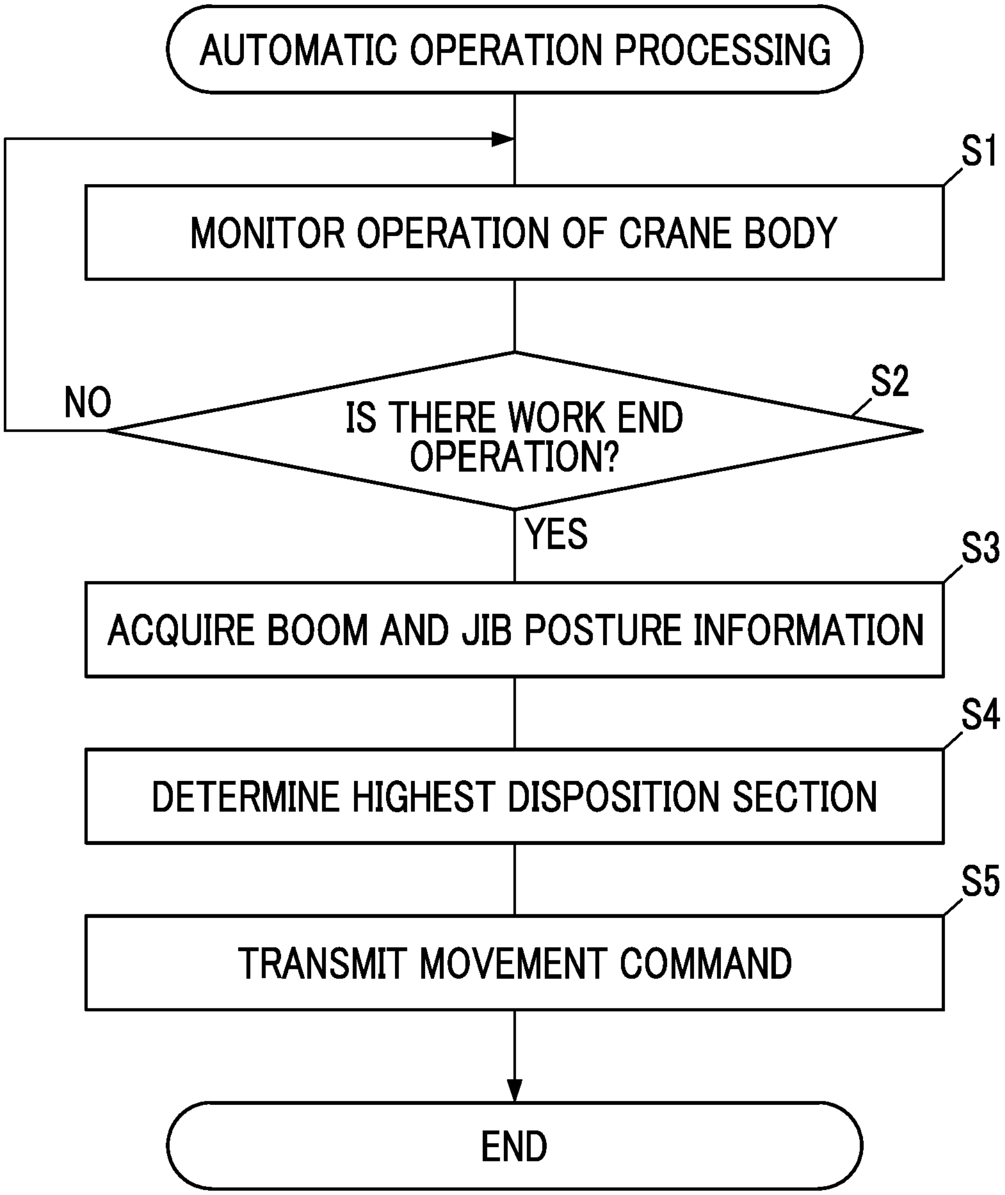
FIG. 11 is a flowchart illustrating an example of automatic operation processing executed by a management device.

FIG. 11 is a flowchart illustrating the automatic operation processing of the mobile unit executed by the management device. In the automatic operation processing, the management device 40 first monitors the operation of the crane body 10A (step S1) and determines the presence or absence of an operation indicating the end of the work of the crane body 10A such as an engine stop operation (step S2).

On the condition that the determination result of step S2 is YES, the management device 40 acquires posture information on the boom 15AA and on the jib 15AB of the crane body 10 (step S3). The management device 40 may calculate and acquire the posture information from the operation history of the crane body 10A or, in a case where the control device of the crane body 10A has the posture information, the posture information may be acquired by being sent from the control device. In addition, positioning information indicating the height of each part of the boom 15AA and the jib 15AB may be sent from another surveying device or from the control device of the crane body 10A, and the posture information may be acquired by calculation therefrom. In addition, in a case where the posture of the crane body 10A at the end of work is limited to several patterns, the operator may input a posture pattern, and the management device 40 may identify the posture from the input information.

Subsequently, the management device 40 determines which of the plurality of disposition sections 18B and 18H is at the highest position based on the posture information (step S4). Then, the management device 40 issues a command to the mobile unit 20 to move to the disposition section determined in step S4 and to operate the obstacle light 26 (step S5). As a result of the command in step S5, the mobile unit 20 moves to and parks in the requested disposition section and operates the obstacle light 26. Then, the management device 40 ends the automatic operation processing.

It should be noted that although an example in which the management device 40 executes each step of FIG. 11 is illustrated in the automatic operation processing described above, the control unit 24 of the mobile unit 20 may receive posture information from the management device 40 and execute the processing of steps S3 to S5. In addition, the mobile unit 20 may have an imaging unit, perform image recognition based on a captured image, determine which of the plurality of disposition sections 18B and 18H has moved to the highest position, and autonomously move to the disposition section that has moved to the highest position.

Effect of Embodiment

As described above, according to the crane systems 1 and 1A to 1D described in the above embodiment, the mobile unit 20 has the obstacle light 26. Accordingly, by disposing the mobile unit 20 in the vicinity of the obstacle light-requiring location of the crane bodies 10 and 10A to 10D and operating the obstacle light, the obstacle light 26 of the mobile unit 20 is capable of functioning as an obstacle light of the crane bodies 10 and 10A to 10D. In addition, according to the above configuration, in a case where the obstacle light 26 fails, the failure can be easily dealt with. For example, the mobile unit 20 can be lowered onto the ground to repair the failed obstacle light 26 without lowering the movable portion 15 of the crane bodies 10 and 10A to 10D. Accordingly, the obstacle light 26 can be easily repaired even at a site where the movable portion 15 cannot be lowered. It should be noted that although an example in which the mobile unit 20 stops at the obstacle light-requiring location of the crane bodies 10 and 10A to 10D is illustrated in the above embodiment, the mobile unit 20 may be disposed in flight around the above location.

Further, according to the crane systems 1 and 1A to 1D of the above embodiment, the crane bodies 10 and 10A to 10D have the disposition sections 18, 18A to 18E, and 18H where the mobile unit 20 can be disposed. Accordingly, the obstacle light 26 can be operated with the mobile unit 20 parked in the disposition sections 18 and 18A to 18E. With this configuration, energy loss attributable to movement of the mobile unit 20 can be reduced when the obstacle light 26 operates. It should be noted that although the above embodiment illustrates a configuration in which the disposition sections 18 and 18A to 18E have a special member for holding the mobile unit 20 exclusively (for example, the connected portion 181) and means for supplying electric power to the obstacle light 26 (for example, the power transmission unit 182), the disposition section where the mobile unit 20 can be disposed may be an existing member of the crane bodies 10 and 10A to 10D (for example, a boom or jib component).

In addition, according to the crane system 1A of FIG. 7, the plurality of disposition sections 18A and 18H are provided so as to correspond to each uppermost portion of the crane body 10A that switches in accordance with the posture of the movable portion. Accordingly, even in a case where the crane body 10A stops in a different posture, the obstacle light 26 can be operated by moving the mobile unit 20 to the uppermost portion at that time. The "uppermost portion" in this specification means the highest position or the surroundings thereof.

In addition, according to the crane system 1A of the embodiment, the management device 40 is provided and executes the determination processing for determining which of the disposition sections 18A and 18H is higher in accordance with the posture of the crane body 10A (step S4 of FIG. 11) and the control processing for moving the mobile unit 20 to the determined disposition section (step S5 of FIG. 11). As a result, a complicated operation of the mobile unit 20 can be omitted in operating the obstacle light 26, and the obstacle light 26 can be operated in the uppermost portion in accordance with the posture of the crane body 10A. Here, the software function of the management device 40 that performs the determination processing corresponds to an example of the determination unit according to the present invention, and the software function of the management device 40 that executes the control processing corresponds to an example of the control unit according to the present invention. The mobile unit 20 may be provided with the configurations for performing the determination processing and the control processing as described above.

In addition, according to the crane system 1A of the embodiment, the mobile unit 20 is controlled to move to the disposition sections 18A and 18H triggered by the end of the work of the crane body 10A. Accordingly, the mobile unit 20 can be automatically moved to the disposition sections 18A and 18H in conjunction with the end of the work of the crane body 10A, and the operator's operation related to the obstacle light 26 can be further omitted. It should be noted that the end of the work of the crane body 10A may mean when the engine of the crane body 10A stops or when the crane body 10A takes a rest posture (for example, a boom-lowered state).

In addition, according to the crane systems 1 and 1A to 1D of the embodiment, the disposition sections 18, 18A to 18E, and 18H are provided with the power transmission unit 182 capable of transmitting electric power to the mobile unit 20. Accordingly, the operation of the obstacle light 26 can be continued even for a long time.

In addition, according to the crane systems 1 and 1A to 1D of the embodiment, the mobile unit 20 operates the obstacle light 26 when power output for movement is stopped and functions as an obstacle light for the crane body 10A. Accordingly, when the mobile unit 20 functions as an obstacle light for the crane body 10A, energy loss attributable to power output for movement can be reduced.

In addition, according to the crane systems 1 and 1A to 1D of the embodiment, the mobile unit 20 can be parked in the disposition sections 18, 18A to 18E, and 18H regardless of the posture of the crane bodies 10 and 10A to 10D, by, for example, adopting the rod body capable of maintaining a certain direction as the connected portion 181. In addition, as in the disposition section 18 of the modification example illustrated in FIGS. 6A and 6B, by providing the posture maintaining mechanism 185, the mobile unit 20 can be parked in the disposition section 18 regardless of the posture of the crane bodies 10 and 10A to 10D. Accordingly, the obstacle light 26 of the mobile unit 20 can be used in various postures. It should be noted that as for the disposition sections 18, 18A to 18E, and 18H and the mobile unit 20, it is sufficient if the mobile unit 20 can be disposed in the disposition sections 18, 18A to 18E, and 18H at least when the crane bodies 10 and 10A to 10D are in the first posture and when the crane bodies 10 and 10A to 10D are in the second posture different from the first posture, and this configuration provides the advantage of being capable of using the obstacle light 26 of the mobile unit 20 in a plurality of postures. For example, even if the mobile unit 20 can be disposed in the disposition sections 18, 18A to 18E, and 18H when the crane bodies 10 and 10A to 10D are in other postures except for some postures (for example, 63° boom posture), the effect is achieved that the obstacle light 26 of the mobile unit 20 can be used in various postures.

In addition, the crane body 10 of the embodiment has a size that requires an obstacle light, does not have a fixed obstacle light, and has the disposition section 18 where the mobile unit 20 can be disposed. Accordingly, by combining with the mobile unit 20 having the obstacle light 26 and operating the obstacle light 26 in the disposition section 18, the crane body 10 can be stopped with the movable portion 15 standing. It should be noted that the disposition section 18 is not limited to a dedicated configuration for disposing the mobile unit 20, and the disposition section 18 may be a non-dedicated configuration such as a boom or jib cross member and a plate member connected to the boom or jib.

In addition, the crane body 10 of the embodiment includes, as a special disposition section, the disposition section 18 having a special structure for holding the mobile unit 20 (for example, the connected portion 181 or the posture maintaining mechanism 185 made of a member different from an existing boom or jib component) or a structure for supplying electric power to the obstacle light 26 (for example, the power transmission unit 182). The special structure for holding the mobile unit 20 means a structure including a member having a unique shape for stopping the mobile unit 20 or a structure including a component that an existing boom or jib does not have in order to stop the mobile unit 20. By having the special disposition section as described above, the obstacle light 26 is capable of functioning as an obstacle light for the crane body 10 by combining the crane body 10 and the mobile unit 20 having the obstacle light 26 and operating the obstacle light 26 in the disposition section 18. The disposition section 18 can be identified as a special disposition section in that the disposition section 18 has the above structure for disposing the mobile unit 20. The crane body 10 with the special disposition section may have the fixed obstacle light 126 or may be a crane body that does not require an obstacle light. For example, the crane body 10 with the special disposition section may have a size that does not require an obstacle light.

In addition, according to the crane system 1B of FIG. 8, the fixed obstacle light (first obstacle light) 126 and the obstacle light 26 of the mobile unit 20 are provided. Further, the disposition section 18B is positioned in the uppermost portion of the crane body 10B when the fixed obstacle light 126 is in a posture of not being positioned in the uppermost portion of the crane body 10B. Accordingly, the obstacle light 126 or the obstacle light 26 of the mobile unit 20 can be operated in the uppermost portion corresponding to the posture of the crane body 10B to notify an aircraft of the presence of the crane body 10B.

In addition, the mobile unit 20 of the embodiment has the obstacle light 26 functioning as an obstacle light for the crane bodies 10 and 10A to 10D. Accordingly, by combining the mobile unit 20 with the crane bodies 10 and 10A to 10D having the disposition sections 18, 18A to 18E, and 18H where the mobile unit 20 can be parked, the obstacle light 26 can be operated in the disposition sections 18, 18A to 18E, and 18H. As a result, an aircraft can be notified of the presence of the crane bodies 10 and 10A to 10D.

In addition, the mobile unit 20 of the embodiment includes the connecting portion 30 that can be connected to the components of the crane bodies 10 and 10A to 10D. Accordingly, the obstacle light 26 can be used with the mobile unit 20 fixed to the crane bodies 10 and 10A to 10D by connecting the connecting portion 30.

It should be noted that a configuration in which the mobile unit has an obstacle light has been described in the above embodiment. However, the mobile unit may be configured to have electrical equipment other than the obstacle light. The obstacle light corresponds to an example of the second electrical equipment according to the present invention. In addition, the electrical equipment other than the obstacle light also corresponds to an example of the second electrical equipment according to the present invention. With such a configuration, in a case where the electrical equipment used by the crane body fails, the failure can be easily dealt with. The electrical equipment of the mobile unit may be configured to replace the electrical equipment provided in the crane body (corresponding to first electrical equipment). For example, the crane body may have a limit switch detecting the movement of a predetermined component such that the position of the component does not exceed a limit range (for example, the limit switches described in Japanese Unexamined Patent Publication No. 7-290584 and Japanese Unexamined Patent Publication No. 2004-10202). In this case, the mobile unit may have a limit switch substitute. According to such a configuration, in a case where the limit switch of the crane body fails, the mobile unit may be moved and connected to the location to cause the limit switch substitute to function. The limit switch substitute may adopt a configuration in which a detection result is wirelessly sent to a crane body control device.

In addition, the mobile unit may have a functional unit providing a function contributing to the work of the crane body as a function other than the obstacle light function and the obstacle light movement function. The functional unit only has to realize the function contributing to the work of the crane body, and examples thereof include a functional unit contributing to crane body work monitoring (for example, suspended load monitoring and perimeter monitoring) and a functional unit contributing to crane body inspection. The functional unit contributing to the work monitoring can be realized by, for example, means for imaging a monitoring target and transmitting data on the captured image to the management device or the function of monitoring the crane body from above, monitoring contact between a suspended load and a surrounding object, or monitoring swinging of the suspended load. The functional unit contributing to the inspection can be realized by, for example, means for imaging an inspection target and transmitting data on the captured image to the management device or holding the data in a readable manner, means for performing the inspection itself with a sensor for inspection, or means of assisting in the inspection by, for example, carrying a tool. According to the configuration having the above functional unit, it is possible to realize a function contributing to the work of the crane body by diverting the mobile unit during crane work.

An embodiment of the present invention has been described above. However, the present invention is not limited to the above embodiment. For example, the mobile unit may be configured such that the obstacle light is supplied with electric power via a wired power line and be configured to move by hanging the power line. In addition, the mobile unit may be configured to be provided with an electric power storage battery, and the electric power of the obstacle light may be supplied from the battery. In addition, in the above embodiment, a configuration is illustrated in which interconnection is performed by the gripping mechanism of the mobile unit gripping the rod-shaped connected portion of the crane body. However, the interconnection method is not limited. For example, various locking mechanisms may be adopted, and a mechanism may be adopted in which a magnet is adsorbed and an actuator is driven to release the magnet adsorption.

Further, although an example in which the mobile unit is a so-called drone is illustrated in the above embodiment, the method of moving the mobile unit is not particularly limited, and any movement method may be adopted, such as a mobile unit moving along a boom without flying. In addition, although a crawler crane is illustrated as the crane body in the above embodiment, the type of the crane is not limited, and the crane may be any type of crane, such as tower, truck, and wheel cranes. In addition, the electrical equipment other than the obstacle light of the mobile unit described above is not limited to the limit switch, and any electrical equipment such as an anemometer, an anemoscope, and a camera (for example, a camera for suspended load monitoring) may be used insofar as the electrical equipment is capable of replacing the electrical equipment of the crane. In addition, the functional unit other than the obstacle light function of the mobile unit described above is not limited to the function contributing to crane body work monitoring and the functional unit contributing to crane body inspection and may be any functional unit insofar as the functional unit contributes to crane body work. Other details illustrated in the embodiment can be changed as appropriate without departing from the scope of the invention.

The present invention can be used in crane systems, cranes, and mobile units.

It should be understood that the invention is not limited to the above-described embodiment, but may be modified into various forms on the basis of the spirit of the invention. Additionally, the modifications are included in the scope of the invention.

What is claimed is:

1. A crane system comprising:

a crane body; and a mobile unit movable around the crane body, wherein the mobile unit includes an obstacle light and functions as an obstacle light for the crane body.

2. The crane system according to claim 1, wherein the crane body includes a disposition section where the mobile unit is configured to be disposed.

3. The crane system according to claim 2, wherein a plurality of the disposition sections are provided so as to correspond to at least two uppermost portions of the crane body which are switched depending on a posture of the crane body.

4. The crane system according to claim 3, further comprising:

a determination unit determining one disposition section corresponding to the uppermost portion of the crane body among the plurality of disposition sections; and a control unit moving the mobile unit to the one disposition section.

5. The crane system according to claim 2, wherein the crane body includes a first obstacle light, and the mobile unit moves to the disposition section corresponding to an uppermost portion of the crane body in a case of a posture in which the first obstacle light is not positioned in the uppermost portion of the crane body.

6. The crane system according to claim 2, wherein the mobile unit moves to the disposition section triggered by ending of work of the crane body.

7. The crane system according to claim 2, wherein the disposition section is provided with a power transmission unit supplying electric power to the obstacle light of the mobile unit.

8. The crane system according to claim 2, wherein the mobile unit functions as the obstacle light when output of power for movement is stopped.

9. The crane system according to claim 2, wherein the mobile unit and the disposition section are configured such that the mobile unit can be disposed in the disposition section when the crane body is in a first posture and when the crane body is in a second posture different from the first posture.

10. A crane requiring an obstacle light, the crane comprising a disposition section where a mobile unit with an obstacle light can be disposed is provided, while an obstacle light is not provided at an obstacle light-requiring position.

11. A crane comprising a special disposition section including a special structure for holding a mobile unit including an obstacle light or a structure for supplying electric power to the obstacle light of the mobile unit.

12. A mobile unit movable around a crane body, the mobile unit comprising:

second electrical equipment functioning as first electrical equipment of the crane body; and a functional unit providing a function contributing to work of the crane body with a function other than the second electrical equipment.

13. The mobile unit according to claim 12, further comprising a connecting portion connectable to a component of the crane body.

14. The mobile unit according to claim 12, wherein the mobile unit is disposed at a part of the crane body, and the second electrical equipment is driven when the first electrical equipment fails.

15. The mobile unit according to claim 12, wherein the second electrical equipment is an obstacle light.

* * * * *